United States Patent [19]

Oba

[11] Patent Number: 4,714,825

[45] Date of Patent: Dec. 22, 1987

[54] SYSTEM FOR CALIBRATING THE TIME AXIS OF AN X-RAY STREAK TUBE

[75] Inventor: Koichiro Oba, Hamamatsu, Japan

[73] Assignee: Hamamatsu Photonics Kabushiki Kaisha, Hamamatsu, Japan

[21] Appl. No.: 805,425

[22] Filed: Dec. 4, 1985

[30] Foreign Application Priority Data

Dec. 11, 1984 [JP] Japan ............................ 59-261438

[51] Int. Cl.[4] ........................................ G01D 18/00

[52] U.S. Cl. ............................ 250/213 VT; 378/207

[58] Field of Search ................ 250/213 VT; 378/207, 378/136–138, 99; 358/111

[56] References Cited

U.S. PATENT DOCUMENTS 3,033,984 5/1962 Fisher et al. ................ 250/213 VT 4,606,061 8/1986 Ramamurti ........................ 378/136

OTHER PUBLICATIONS

*Proceedings of Spie,* "High Speed Photography, Videography and Photonics," (Aug. 23–25, 1983, pp. 36–44).

*Primary Examiner*—Edward P. Westin
*Assistant Examiner*—Charles Wieland
*Attorney, Agent, or Firm*—Spencer & Frank

[57] ABSTRACT

A system for calibrating the time axis of an X-ray streak tube comprising a light source for generating a train of light pulses and an X-ray tube including a photocathode for receiving the light pulses. Upon receiving the light pulses, the X-ray tube generates a train of X-rays which excite the photocathode of the streak tube causing it to emit an electron beam. The electron beam is scanned by a sweep voltage synchronized with the light pulses and applied across deflection electrodes in the streak tube. The deflected beam impinges on the phosphor screen of the streak tube where the time interval of the streak image is measured.

3 Claims, 5 Drawing Figures

SYSTEM FOR CALIBRATING THE TIME AXIS OF AN X-RAY STREAK TUBE

BACKGROUND OF THE INVENTION

The present invention relates to the calibration of the time axis of an X-ray streak tube when an X-ray pulse with an extremely short duration of time is generated by a pulse mode X-ray tube with the photocathode of the pulse mode X-ray tube responding to a laser beam pulse having an extremely short duration of time.

Conventional method for calibrating the time axis of an X-ray streak tube will be described referring to FIGS. 1 and 2.

FIG. 1 shows a block diagram of an example of a device to calibrate the time axis of an X-ray streak tube in the conventional way.

FIG. 2 is a graph of an X-ray spectrum obtained from an X-ray target to generate X-rays with an extremely short duration of time, which can be used in the device to calibrate the time axis of the X-ray streak tube in the conventional way.

A laser pulse signal with an extremely short duration of time goes into two paths, one passing through half mirror 3 and the other reflected from the half mirror 3. The laser pulse signal along the former path goes through etalon 2 where a train of light pulses 4 with a certain time interval can be generated.

An aluminum (Al) or titanium (Ti) target 14 is exposed to a train of light pulses 4 so as to generate a laser plasma. A train of soft X-ray pulses resembling the light pulses can thus be generated.

FIG. 2 shows the spectrum distribution of the soft X-ray pulses when target 14 is made of titanium (Ti).

Photocathode 10, which is of the X-ray excitation type, in the X-ray streak tube is exposed to a train of X-ray pulses.

Photocathode 10 of the X-ray excitation type is stimulated by a train of soft X-ray pulses 15 so as to emit electron beam 12.

The other light pulse reflected from the half mirror 3 is detected by high speed light detector 5.

Deflection voltage generator circuit 7, which generates a sweep voltage for scanning the X-ray streak tube, is used to apply the sweep voltage to deflection electrode 9 of the streak tube 27 when the deflection voltage generator circuit 7 is triggered by the output of the high speed light detector 5.

Electron beam 12 emitted from the photocathode 10 of X-ray excitation type is deflected by the deflection field across the deflection electrodes 9.

When the light pulse image is created on the phosphor layer 11 in accordance with the train of the X-ray pulses incident onto the photocathode 10 of the X-ray excitation type, the time axis of the streak tube can be calibrated by measuring both interval 16 and half-value width 17 of the light pulse image on the phospor layer 11.

The soft X-rays generated by such laser plasma as used in the device to calibrate the time axis of the X-ray streak tube shown in FIG. 2, have an energy distribution covering up to 1.5 KeV to 2.0 KeV. The energy covers the wavelength ranging from the VUV rays to the soft X-rays.

Each soft X-ray pulse is delivered in accordance with a time sequence which is different from the incident laser pulse. In other words, the laser plasma is created on the target which has absorbed the laser energy. The wavelength distribution of the electromagnetic waves (VUV through soft X-rays) radiated from the target can be determined depending on the plasma temperature, and the time sequence can be determined depending on the transient characteristics of the plasma. During radiation in the VUV region, for instance, a long time constant is observed.

A threshold exists in laser energy to generate the soft X-rays. That is, soft X-ray pulses cannot be so stable as to calibrate the time axis.

The objective of the present invention is to provide apparatus for calibrating the time axis of an the X-ray streak tube using an improved X-ray source providing the capability to accurately calibrate the time axis of the X-ray streak tube.

SUMMARY OF THE INVENTION

The system to calibrate the time axis of the X-ray streak tube, in accordance with the present invention, generates a train of light pulses with a pre-determined interval of time in its light source, which is to be used to excite the photocathode of the X-ray tube.

In the X-ray tube consisting of a photocathode, focusing means and an X-ray target, the photocathode is exposed to a train of light pulses so as to generate a train of X-ray pulses.

The photocathode of the X-ray streak tube whose time axis is to be calibrated is exposed to a train of X-ray pulses, and electron beam deflection means of the X-ray streak tube is operated in such a way that the deflection is synchronized with a train of the light pulses. The time axis of the X-ray streak tube can then be calibrated by measuring the time interval of the streak images on the phosphor layer of the X-ray streak tube.

DESCRIPTION OF THE PREFERRED EMBODIMENT

The invention will be described hereafter in detail, referring to the attached drawings.

Figure 3:
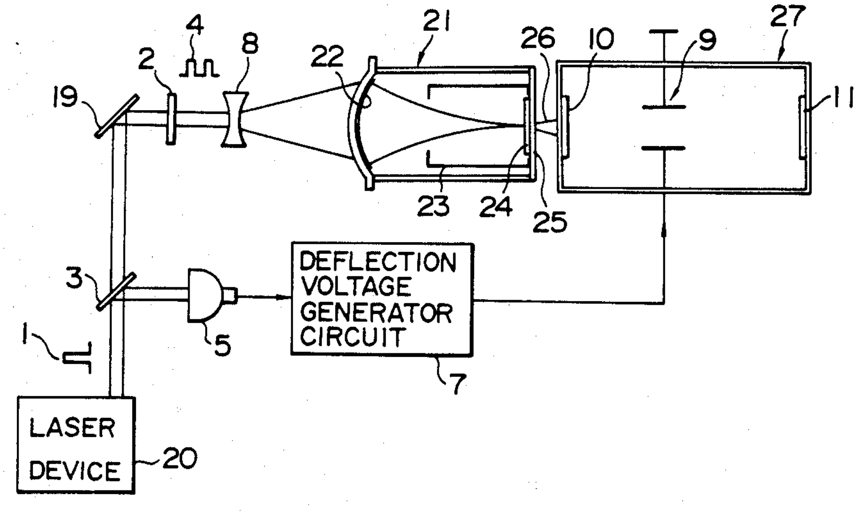
FIG. 3 is a block diagram of an embodiment of a device to calibrate the time axis of the X-ray streak tube in accordance with the present invention.

Light pulse 1 with an extremely short duration of time, shown in FIG. 3, is generated from laser device 20, i.e., a Q-switched Argon dye laser or a laser diode, and it then splits into two paths while incident on half mirror 3.

The light pulse passing through the half mirror 3 is converted into a train of light pulses 4 by means of etalon 2.

Figure 4:
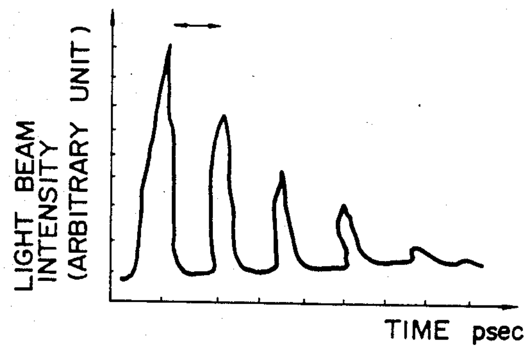
FIG. 4 is a graph of the intensity distribution of the light image along the time axis on the phosphor screen of the light streak tube used in the visible light region when the photocathode is excited by a train of light pulses generated by an etalon.

Such light pulses as shown in FIG. 4 are spread when passing through lens 8, and then they are incident on photocathode 22 of pulse mode X-ray tube 21. Photocathode 22 is arranged on the inner surface of a vacuum envelope of X-ray tube 21, on which the assignee of this invention already filed Japanese Patent Application No. 153663/1983.

Photoelectrons emitted from the photocathode 22 are led to a focusing point by using focusing electrode 23, and then they are accelerated by an acceleration field toward metal target 24 which emits X-rays 26 from the opposite side. Photoelectrons focused into the spot strike the metal target 24.

Figure 1:
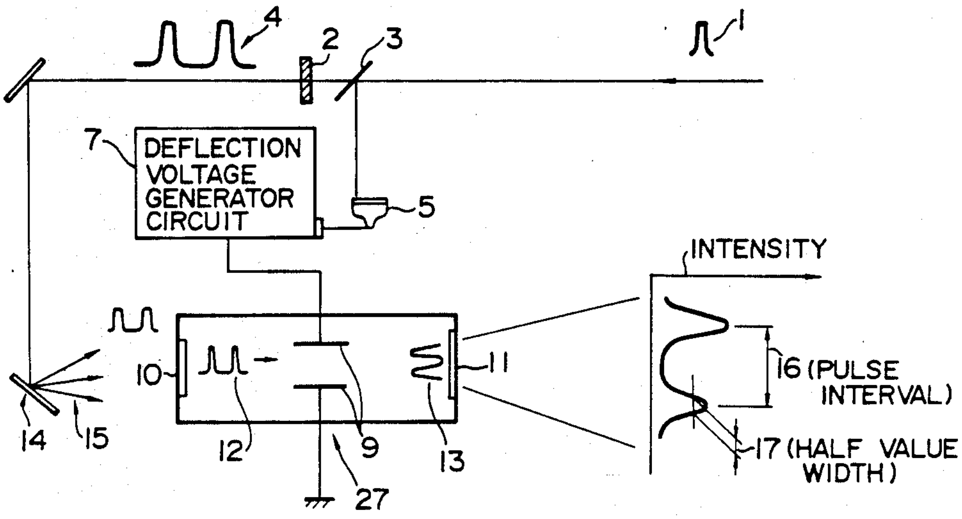
FIG. 1 PRIOR ART
FIG. 1 is a block diagram of an example of a device for calibrating the time axis of an X-ray streak tube in a conventional way.
Figure 2:
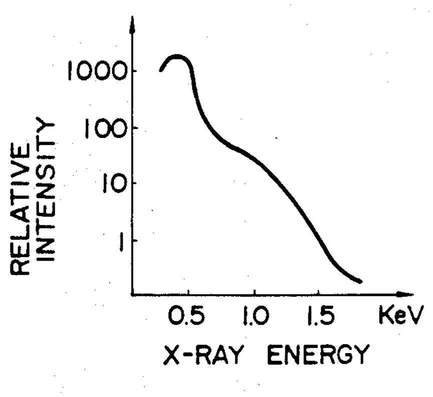
FIG. 2 PRIOR ART
FIG. 2 is a graph of the X-ray spectrum obtained from the X-ray target to generate a X-rays with an extremely short duration of time or laser plasma, which can be used in the conventional device to calibrate the time axis of the X-ray streak tube.
Figure 5:
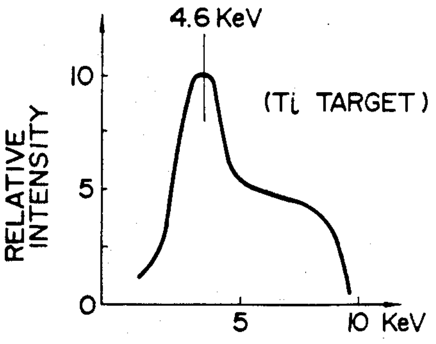
FIG. 5 is a graph of the X-ray spectrum generated from the X-ray tube used in the device of the present invention.

The spectrum of the emitted X-rays is composed of both the characteristic X-rays of Ti at an energy of 4.6 KeV and continuously distributed X-rays called BREHMSCHTRAHLUNG as shown in FIG. 5.

These X-rays can travel passing though window 25 made of beryllium plate forming part of the vacuum envelope, and go out of the vacuum envelope of the X-ray tube.

The sweep voltage to be applied to deflection electrode 9 of the streak tube is generated by using both high speed light detector 5 and deflection voltage generator circuit 7. Part of the laser pulse from laser device 20 goes into the high speed light detector 5 after being reflected by half mirror 3, and produces an electronic pulse, which, in turn, is sent to the deflection voltage generator circuit 7 to generate the sweep voltage to start operation.

Electron beams from the photocathode of X-rays are scanned by the sweep voltage across deflection electrodes 9 responding to the trigger pulse from the detector 5, and they are incident on phosphor layer 11 producing a time response image consistent with a train of light pulse images along the time axis of the X-ray streak tube.

The time interval of a train of X-ray pulses generated from X-ray generation tube 21 corresponds to a train of light pulses incident on the photocathode, and the time axis of the streak tube can be calibrated in accordance with the interval of the light on the phosphor layer 11.

The X-ray pulses used to drive streak tube 27 are generated from the X-ray tube but not from the laser plasma, and different characteristic X-rays can be obtained by selectively using different target materials.

When the BREHMSCHTRAHLUNG is utilized, the X-ray energy distribution range can widely be changed by changing the operating voltages of the X-ray tube.

The time required to generate the photoelectrons responding to the incident light beam after the light beam is incident on the photocathode, and the time required to generate the X-rays responding to the electron beam after the electron beam is incident on the target are less than 1 ps, respectively.

When the method of this invention is compared with the X-ray streak image generated by utilizing the laser plasma method, the same X-ray image time structure as the light pulse image can be generated in accordance with the present invention. Thus, the X-ray image time structure generated in accordance with the present invention is ideal for calibrating the time axis.

What is claimed is:

1. A system for calibrating the time axis of an X-ray streak tube, said streak tube including a first photocathode, deflection means and a phosphor surface, comprising:

- a light source for generating a train of light pulses, said light pulses being spaced by a predetermined interval of time;
- X-ray tube means including a second photocathode, focusing means and an X-ray target, said X-ray tube means generating a train of X-rays when said second photocathode is exposed to said light pulses;
- means for exposing said first photocathode of said streak tube to said train of X-rays, said first photocathode emitting an electron beam in response thereto;
- means for energizing the deflection means of said streak tube, the energizing of said deflection means being synchronized with said train of light pulses; and
- means for measuring the time interval of the streak image generated by said electron means on the phosphor surface of said X-ray streak tube.

2. A system for calibrating the time axis of an X-ray streak tube as claimed in claim 1 wherein said light source comprises a laser pulse generation device and an etalon, the duration of said light pulses being extremely short.

3. A system for calibrating the time axis of an X-ray streak tube as claimed in claim 1 wherein said means for energizing the deflection means of said streak tube generates a deflection voltage synchronized with said train of light pulses.

* * * * *